(12) United States Patent
Ebina et al.

(10) Patent No.: US 12,403,797 B2
(45) Date of Patent: Sep. 2, 2025

(54) SEAT DEVICE

(71) Applicant: KOITO ELECTRIC INDUSTRIES, LTD., Shizuoka (JP)

(72) Inventors: Shunya Ebina, Shizuoka (JP); Masanobu Nakane, Shizuoka (JP); Yutaka Nagao, Shizuoka (JP)

(73) Assignee: KOITO ELECTRIC INDUSTRIES, LTD, Shizuoka (JP)

( * ) Notice: Subject to any disclaimer, the term of this patent is extended or adjusted under 35 U.S.C. 154(b) by 195 days.

(21) Appl. No.: 18/254,873

(22) PCT Filed: Nov. 10, 2021

(86) PCT No.: PCT/JP2021/041297
§ 371 (c)(1),
(2) Date: May 29, 2023

(87) PCT Pub. No.: WO2022/113737
PCT Pub. Date: Jun. 2, 2022

(65) Prior Publication Data
US 2023/0415619 A1 Dec. 28, 2023

(30) Foreign Application Priority Data

Nov. 30, 2020 (JP) ................................. 2020-198656

(51) Int. Cl.
*B60N 2/14* (2006.01)
*B60N 2/06* (2006.01)
*B60N 2/20* (2006.01)

(52) U.S. Cl.
CPC ................. *B60N 2/14* (2013.01); *B60N 2/06* (2013.01); *B60N 2/20* (2013.01)

(58) Field of Classification Search
CPC .... A47C 1/024; A61G 5/1067; B61D 33/021; B60N 2/14; B60N 2/06; B60N 2/20
(Continued)

(56) References Cited

U.S. PATENT DOCUMENTS

| 7,255,398 B2* | 8/2007 | Tokui | B60N 2/20 297/378.12 |
| 2003/0052523 A1* | 3/2003 | Becker | B60N 2/20 297/378.12 |

(Continued)

FOREIGN PATENT DOCUMENTS

| JP | 58188334 U1 | 12/1983 |
| JP | 2002-301955 A | 10/2002 |

(Continued)

OTHER PUBLICATIONS

International Search Report for PCT/JP2021/041297 dated on Feb. 8, 2022 issued by JPO as ISA.

*Primary Examiner* — Jose V Chen
(74) *Attorney, Agent, or Firm* — Kubotera & Accosiates, LLC

(57) ABSTRACT

A seat device (10) that can reliably and easily regulate a reclining operation with a simple and compact configuration, only in a specific state where the reclining operation of a seat (1) is problematic. It includes a reclining operation unit (100) that performs an operation of tilting a backrest (3) of the seat (1) by a reclining mechanism (50), a lock mechanism (120) that restrains the reclining operation unit (100) to disable the operation when the seat (1) is in a long state, and a cable (124) that is pulled in conjunction with conversion into the long state of the seat (1). The lock mechanism (120) includes a stopper (121) that is linearly moved to be engaged with and released from an operation lever (110) of the reclining operation unit (100), and the stopper (121) is directly pulled by the cable (124) to be linearly moved to a restrained position at which the stopper (121) is engaged with the operation lever (110) to disable the operation.

6 Claims, 13 Drawing Sheets

(58) Field of Classification Search
USPC .................................................. 297/354.12
See application file for complete search history.

(56) References Cited

U.S. PATENT DOCUMENTS

| | | | | |
|---|---|---|---|---|
| 2003/0122412 | A1* | 7/2003 | Niimi | B60N 2/12 |
| | | | | 297/341 |
| 2012/0217781 | A1* | 8/2012 | Nock | B60N 2/20 |
| | | | | 297/354.12 |
| 2013/0057041 | A1* | 3/2013 | Ngiau | B60N 2/3059 |
| | | | | 297/354.12 |
| 2013/0187423 | A1* | 7/2013 | Pleskot | B60N 2/22 |
| | | | | 297/354.12 |
| 2016/0101715 | A1* | 4/2016 | Kristen | H01H 21/50 |
| | | | | 297/354.12 |
| 2017/0113578 | A1* | 4/2017 | Shiraishi | B60N 2/80 |
| 2023/0109265 | A1* | 4/2023 | Nakane | A47C 1/12 |
| | | | | 297/337 |
| 2023/0182623 | A1* | 6/2023 | Kapusky | B60N 2/3011 |
| | | | | 297/362 |
| 2023/0292922 | A1* | 9/2023 | Rains | A47C 1/143 |
| | | | | 297/354.12 |
| 2024/0416813 | A1* | 12/2024 | Kapusky | F16C 1/12 |

FOREIGN PATENT DOCUMENTS

| | | | | |
|---|---|---|---|---|
| JP | 3431772 | B2 | 5/2003 | |
| JP | 2016-159735 | A | 9/2016 | |
| KR | 101669761 | B1 * | 10/2016 | |
| WO | WO-2021119576 | A1 * | 6/2021 | ............ B60N 2/123 |

* cited by examiner

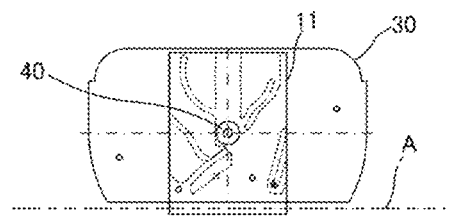
FIG. 15 (a) — Long State rotation angle: 0°
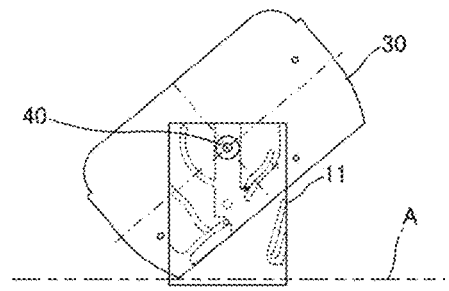
FIG. 15 (b) — rotation angle: 45°
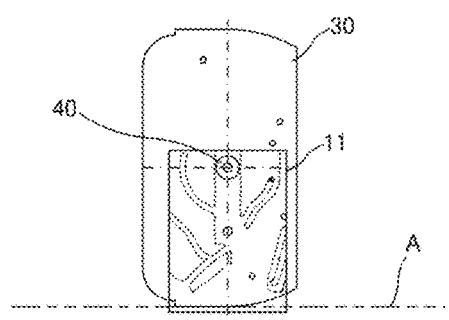
FIG. 15 (c) — One Cross State rotation angle: 90°
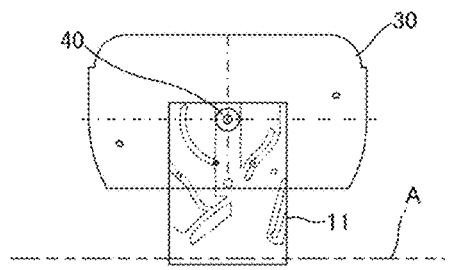
FIG. 15 (d) — rotation angle: 0°
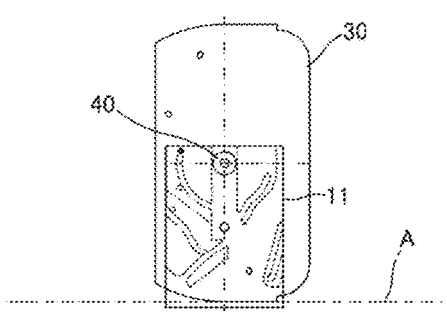
FIG. 15 (e) — Reverse Cross State rotation angle: -90°

SEAT DEVICE

TECHNICAL FIELD

The present invention relates to a seat device that can convert the state of a seat.

BACKGROUND ART

Conventionally, there are seats of a stool type mounted in, for example, railroad cars, which are long in both directions and can seat a plurality of persons, and are generally installed along walls in cabins. Among the stool type seats, a rotary seat is known that can be rotated about a rotation axis in the center of the seat to convert the orientation of the seat between a long state where the back of the seat is parallel to and along a wall, and a cross state where the back of the seat is orthogonal to the wall.

As for such a rotary seat, a seat device has been proposed that includes a sliding mechanism in addition to a rotation mechanism of the seat, and further includes a transmission mechanism for interlocking each mechanism, so that the trajectory (turning radius) of the seat does not interfere with a wall, when rotating the seat from the long state along the wall to the cross state (refer to, for example, Patent Literature 1).

In the seat device, in order to expand the aisle width between seats on both sides in a cabin as much as possible to obtain a comfortable space, the rotation axis of the seat is located near a wall in the long state, while the rotation axis of the seat is slid to an aisle side in the cross state, so that the seat does not interfere with the wall. Therefore, in the seat device, in order to prevent the interference with the wall in the long state, a backrest could not be tilted, and a reclining mechanism for improving seating comfort could not be provided.

Therefore, the present inventors have proposed, in Japanese Patent Application No. 2020-34280, a seat device that regulates a reclining operation when a seat is in the long state. This seat device disables the reclining operation by a lock mechanism provided in an armrest, when the seat is in the long state. The lock mechanism restrains a reclining operation lever by using an L-shaped link and a lock pin that are interlocked for conversion of the state of the seat. The L-shaped link is a member that is long in the vertical direction, and the lock pin is operated in the vertical direction by the L-shaped link.

Additionally, as another rotary seat, a rotary seat is proposed that includes an anti-movement mechanism for disabling the reclining mechanism when the seat faces a window side (for example, see Patent Literature 2).

The anti-movement mechanism is provided with long links on both sides of a bottom surface side (movable base) of the seat, a reclining operation wire is connected to one end side of the links, a wire of the reclining operation lever as well as a tension spring are connected to the other end side, and when the seat faces the window side, the tension spring is pulled, and the wire of the operation lever is disabled to be towed.

PATENT LITERATURE

Patent Literature 1: Japanese Patent No. 3431772
Patent Literature 2: Japanese Utility Model Publication No. 63-13947

SUMMARY OF THE INVENTION

However, in the conventional technique shown in Japanese Patent Application No. 2020-34280 described above, since the lock mechanism provided in the armrest with the reclining operation lever restrained the operation lever by using the L-shaped link and the lock pin, there were large number of parts, the configuration was complicated, and there was a risk of causing a high cost. Additionally, since the L-shaped link was long and bulky in the vertical direction, a substantial arrangement space, which also included its range of movement, was also increased, a limited space for the armrest was eroded, and there was a design problem that it was limited to add, for example, a cushioned elbow pad.

In addition, also in the conventional technique described in Patent Literature 2, since the anti-movement mechanism restrains the operation lever by using a link and a tension spring, there were large number of parts, the configuration was complicated, and there was a risk of causing a high cost. Further, since the links were long and bulky on both sides, a larger arrangement space, which also included its range of movement, was required, and it was difficult to provide the links in the bottom surface side (movable base) of the seat, which is a particularly limited space.

Moreover, the aforementioned anti-movement mechanism did not directly restrain the movement of the operation lever, but indirectly restrained the movement of the operation lever via the wire, the links, and the tension spring. Accordingly, there was a problem that, for example, when the tension spring is deteriorated, restraining of the operation lever became insufficient, and locking lacks certainty.

The present invention has been made by focusing on the problems of the related art as described above, and an object of the present invention is to provide a seat device that can reduce the cost with a simple configuration having a reduced number of parts, can respond to a request of space-saving by enabling a compact configuration, and can reliably and easily regulate a reclining operation only in a specific state where the reclining operation is problematic.

In order to achieve the aforementioned object, one aspect of the present invention is a seat device that can convert a state of a seat, including:
a reclining mechanism that can tilt a backrest of the seat;
an operation unit that performs an operation of tilting the backrest by the reclining mechanism;
a lock mechanism that restrains the operation unit to disable the operation when the seat is in a specific state; and
a cable that is pulled in conjunction with conversion into the specific state of the seat,
wherein the operation unit can be displaced from an ordinary initial position to an operation position at a time of the operation,
the lock mechanism includes a stopper that is linearly moved to be engaged with and released from the operation unit in the initial position, and
the stopper is directly pulled by the cable to be linearly moved from an ordinary unrestrained position at which the stopper is released from the operation unit to a restrained position at which the stopper is engaged with the operation unit to disable the operation.

With the seat device according to the present invention, it is possible to reduce the cost with a simple configuration having a reduced number of parts, to respond to a request of space-saving by enabling a compact configuration, and to reliably and easily regulate a reclining operation only in a specific state where the reclining operation is problematic.

BRIEF DESCRIPTION OF THE DRAWINGS

FIG. 15 is an explanatory diagram showing processes of converting a state of the seat in the seat device according to the embodiment of the present invention.

DETAILED DESCRIPTION OF THE EMBODIMENTS

Hereinafter, an embodiment representing the present invention will be described based on the drawings.

FIG. 1 to FIG. 15 show one embodiment of the present invention.

A seat device 10 according to the present embodiment can convert the state of a seat 1. Here, the state of the seat 1 is a concept including not only the orientation of the seat 1 by rotation, but also the change in the front and back position of the seat 1, etc. Additionally, although the kind of the seat 1 is not particularly limited, a case will be described below as an example where the seat 1 is applied to a stool for two persons mounted in a cabin of a railroad car. Note that, in each drawing, the relative size relationships, shapes, and the like of components may be appropriately designed and changed, and may be different from actual relative size relationships, shapes, and the like of components.

<Outline of Seat Device 10>

Figure 5:
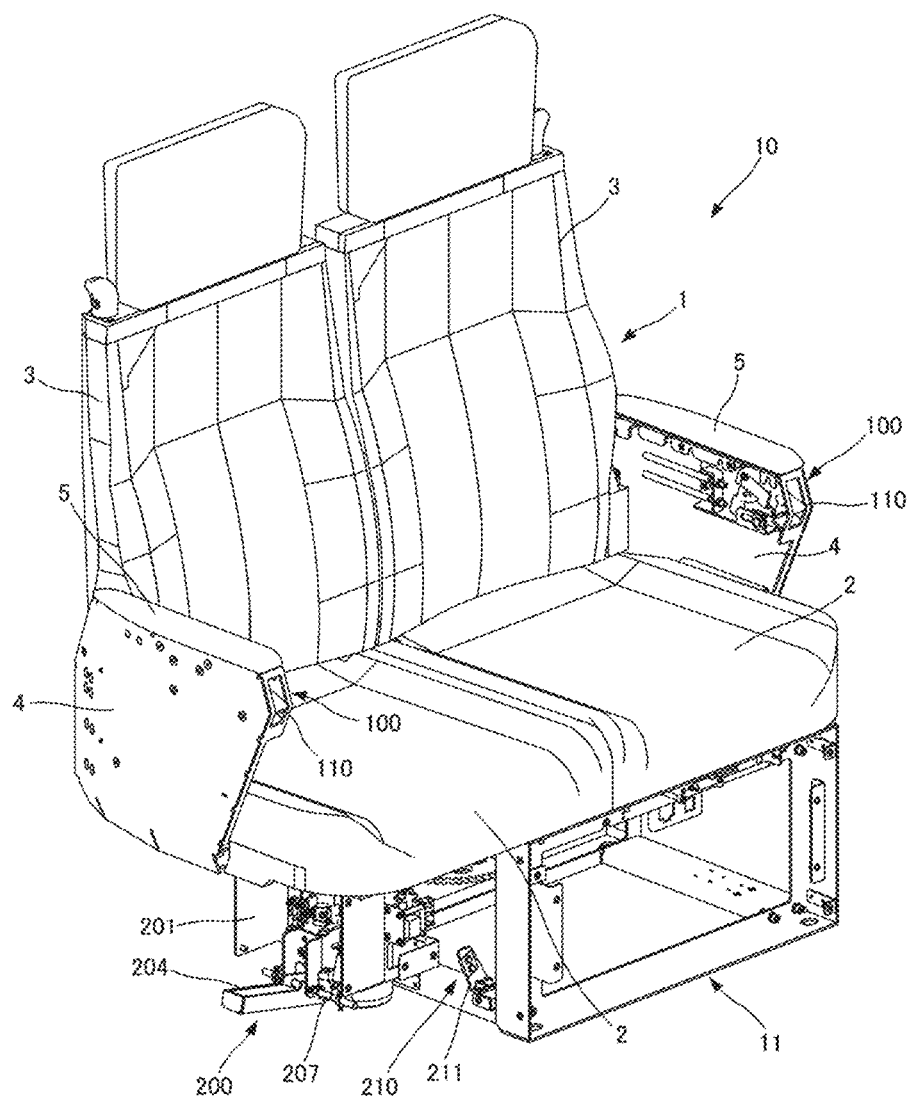
FIG. 5 is a perspective view showing a cross state of the seat device according to the embodiment of the present invention.
Figure 6:
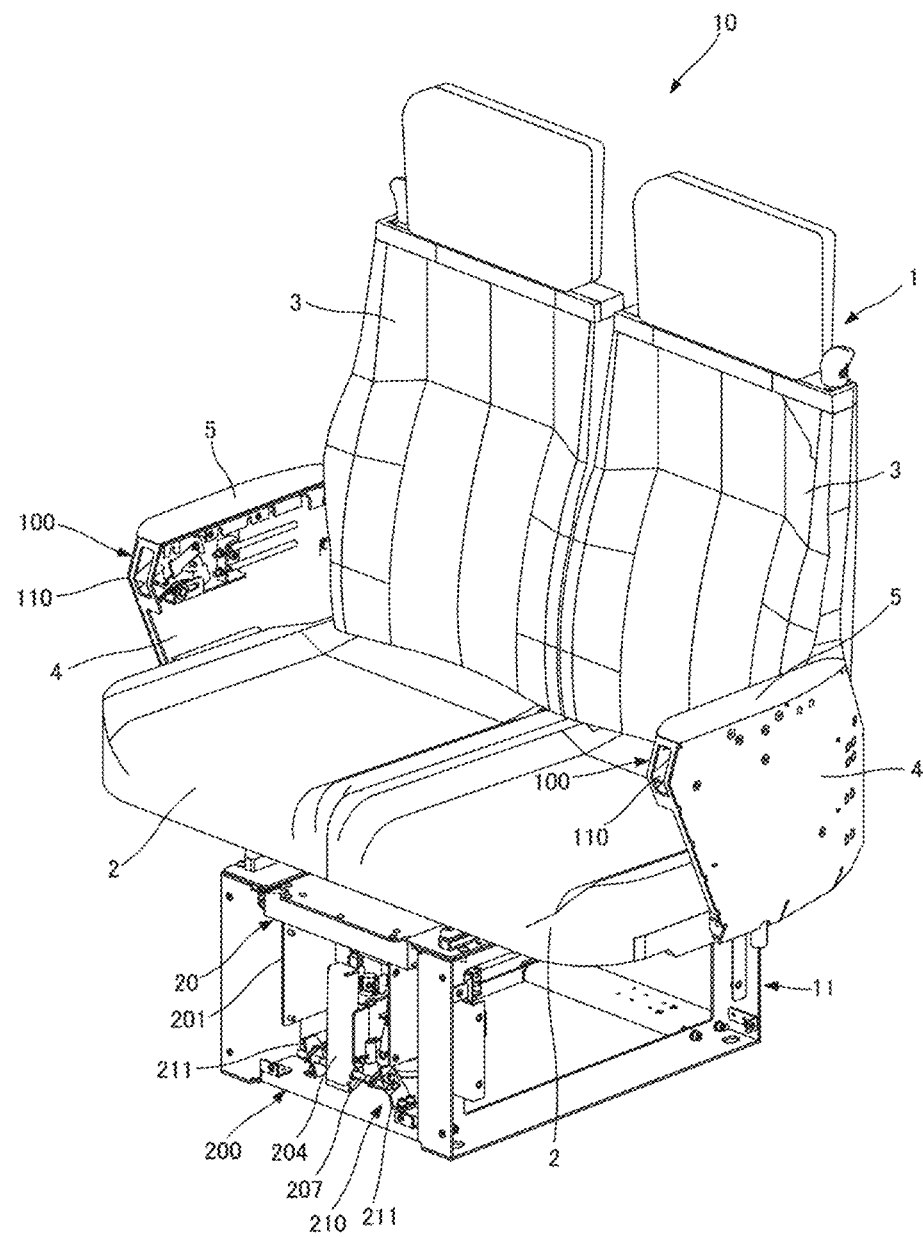
FIG. 6 is a perspective view showing a long state of the seat device according to the embodiment of the present invention.
Figure 7:
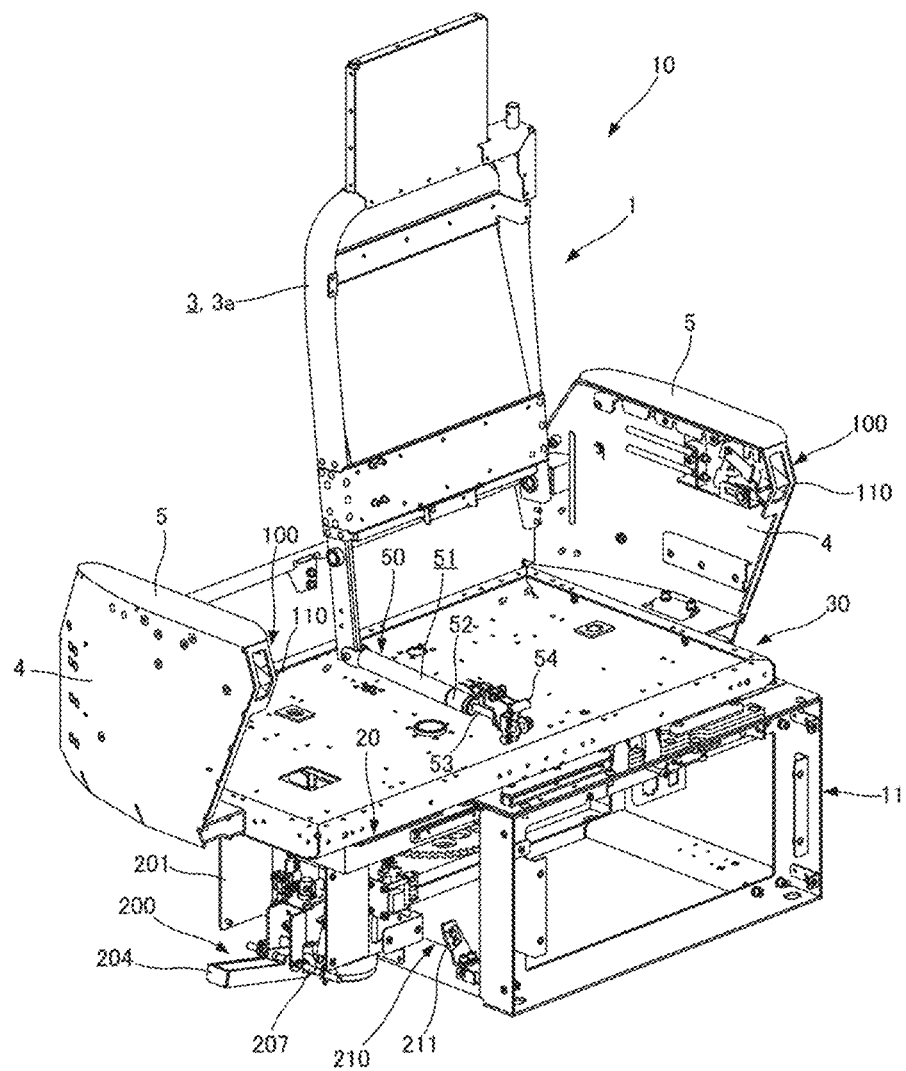
FIG. 7 is a perspective view showing an internal structure of the seat device according to the embodiment of the present invention.
Figure 8:
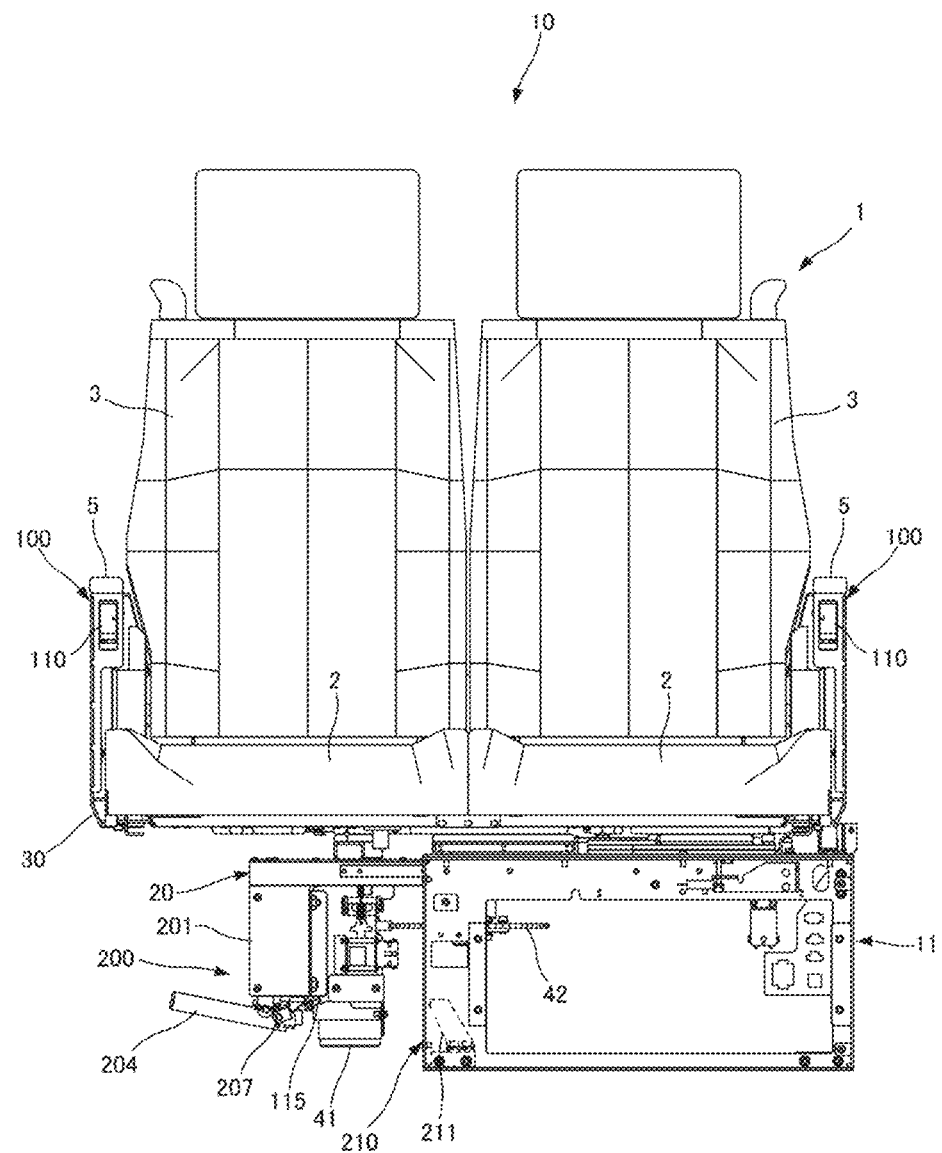
FIG. 8 is a front view showing the cross state of the seat device according to the embodiment of the present invention.
Figure 9:
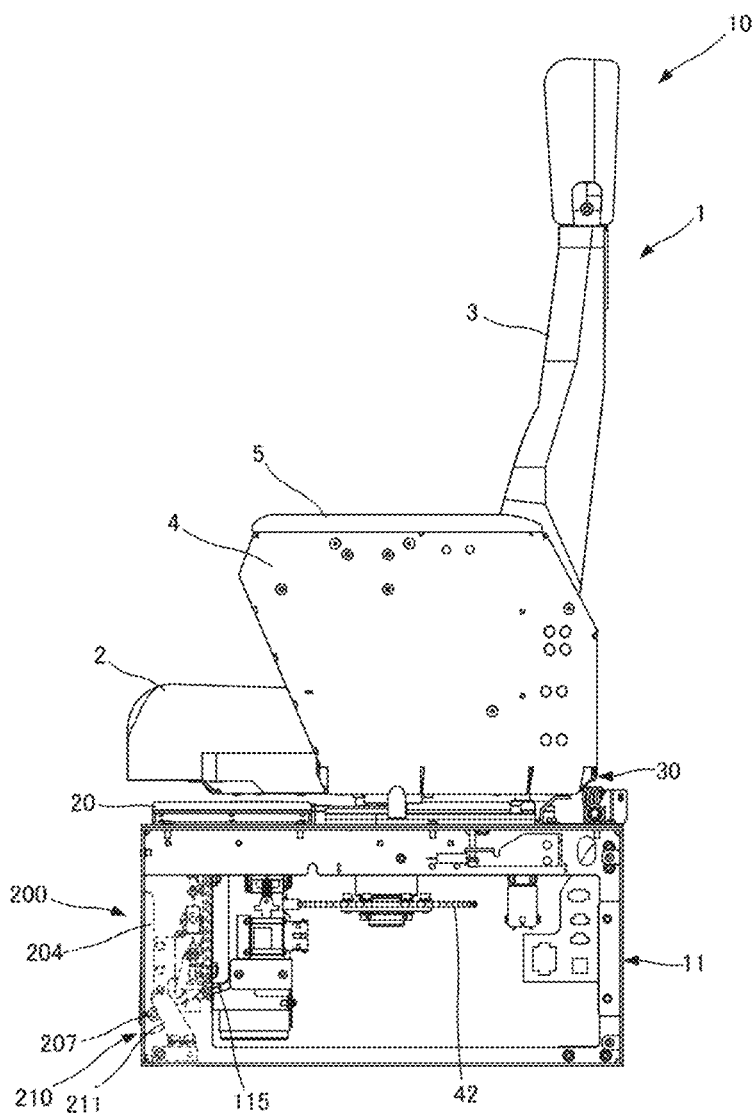
FIG. 9 is a side view showing the long state of the seat device according to the embodiment of the present invention.
Figure 10:
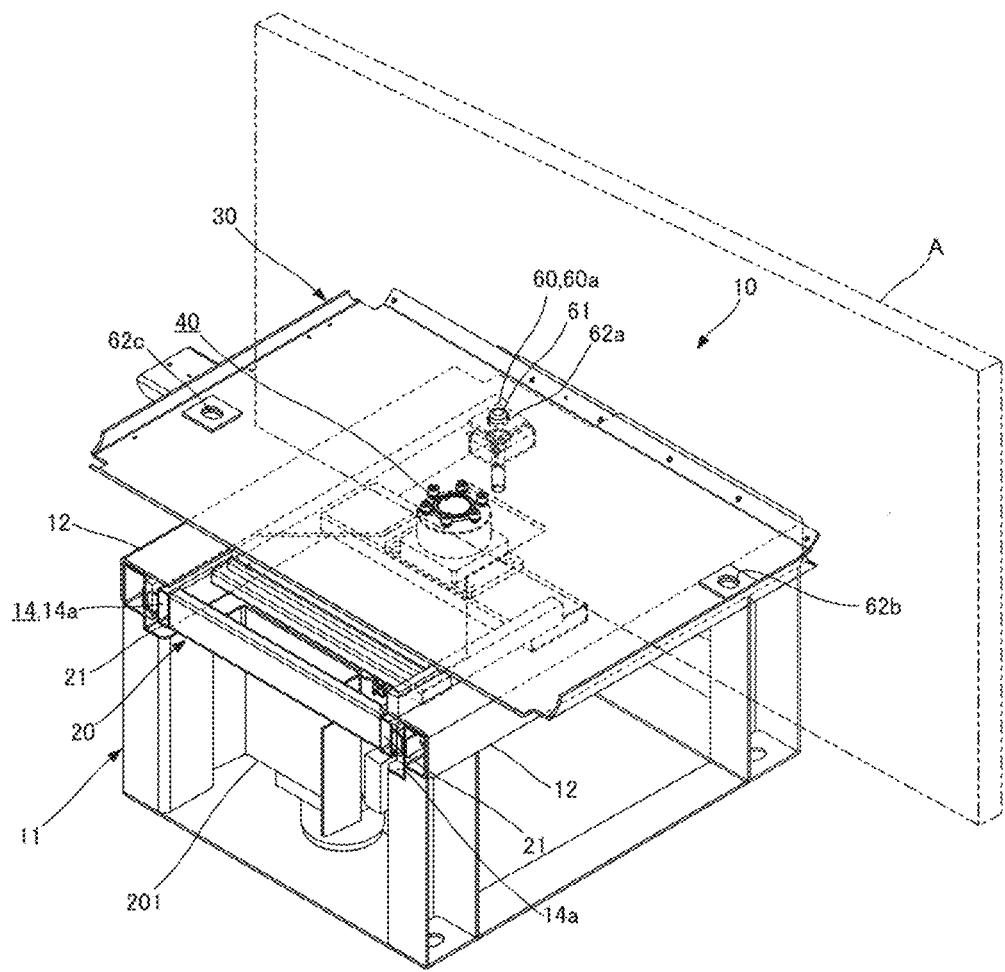
FIG. 10 is a perspective view showing a leg stand, a movable stand, and an underframe of the seat device according to the embodiment of the present invention.

FIG. 10 is a perspective view showing a leg stand 11, a movable stand 20, and an underframe 30 of the seat device 10. FIG. 7 is a perspective view showing an internal structure of the seat device 10. FIG. 5 is a perspective view showing a cross state of the seat device 10, and FIG. 8 is a front view also showing the cross state of the seat device 10. FIG. 6 is a perspective view showing a long state of the seat device 10, and FIG. 9 is a side view also showing the long state of the seat device 10. Note that, in each diagram, slight differences in the shapes of identical parts are merely design changes (for example, a difference in the shape of the leg stand 11 in FIG. 5 and FIG. 10, and the like).

As shown in FIG. 10, the seat device 10 includes a leg stand 11 fixed on a floor surface, a movable stand 20 supported by the leg stand 11 so as to be able to advance and retract in front and back directions, and the underframe 30 of the seat 1 supported by the movable stand 20 so as to be rotatable in forward and backward directions. Here, the leg stand 11 is an example of "a fixed side of the seat" of the present invention, and the movable stand 20 and the underframe 30 are examples of "a movable side of the seat" of the present invention. Note that the seat device 10 is arranged on the floor surface near a wall (window) in the cabin of the railroad car, and "A" in FIG. 10 is a part of the wall parallel to the moving direction of the railroad car.

In the seat device 10, the underframe 30 of the seat 1 is supported on the movable stand 20 to be rotatable about a rotation axis via the rotation mechanism 40. Additionally, the movable stand 20 is supported on the leg stand 11 together with the rotation mechanism 40 via a sliding mechanism 14 so as to be able to advance and retract. Furthermore, although an illustration is omitted, the seat device 10 includes an interlocking mechanism in order to interlock the rotation of the seat 1 by the rotation mechanism 40 with the advancement and retraction of the seat 1 by the sliding mechanism 14.

<Regarding Seat 1>

As shown in FIG. 5, the seat 1 is formed as a stool for two persons by arranging a pair of seating portions 2 and backrests 3 side by side in both directions. A pair of sleeve portions 4 covering the seating portions 2 from the sides are provided on both sides of the seat 1. An upper end side of each sleeve portion 4 serves as an armrest 5 that extends substantially horizontally in front and back directions. Here, the armrest 5 is configured by fitting a cushioned elbow pad on an upper end surface of a frame member, which forms a sleeve portion 4. Additionally, a lower end side of the backrest 3 is supported at a rear end side of the seating portion 2 via a reclining mechanism 50 (refer to FIG. 7) in a tiltable manner.

<Reclining Mechanism 50>

As shown in FIG. 7, the reclining mechanism 50 supports the backrest 3 with respect to the seating portion 2 in a predetermined angular range in a tiltable manner. The reclining mechanism 50 includes, for example, a damper 51 such as a gas spring. The damper 51 is configured such that a piston rod 53 is inserted into a cylinder body 52 so as to be able to protrude, and is arranged on the underframe 30 to be parallel to the front and back directions. Although the damper 51 is urged in a direction in which the piston rod 53 is housed in the cylinder body 52, the piston rod 53 can be fixed in a state where only an arbitrary amount of the piston rod 53 is projected.

A rear end of the cylinder body 52 is connected to a lower end of a frame 3a of backrest 3 so as to be able to be pushed and pulled. On the other hand, a tip of the piston rod 53 that protrudes from a front end of the cylinder body 52 is connected to a proper place of a front end side of the underframe 30. With such a damper 51, the backrest 3 can be held at an arbitrary tilt angle. That is, when the damper 51 is a locked state, the piston rod 53 is fixed in a state where only a predetermined amount of the piston rod 53 is projected from the cylinder body 52, so that the backrest 3 can be held at an arbitrary tilt angle.

When the locked state of the damper 51 is released, the backrest 3 returns to a most upright initial position by the biasing force with which the piston rod 53 is housed in the cylinder body 52. When a seated person presses the backrest 3 backward against the restoring force of the damper 51 in this lock released state, the backrest 3 can be adjusted to an arbitrary tilt angle.

Although a detailed description of the lock mechanism of the damper 51 is omitted since the lock mechanism is common, a release button 54 for releasing the locked state is provided near the piston rod 53. As shown in FIG. 7, a reclining operation unit 100 for pressing this release button 54 to release the locked state is provided in a front end of the armrest 5. Note that the reclining operation unit 100 is an example of the "operation unit" of the present invention.

<Reclining Operation Unit 100>

Figure 1:
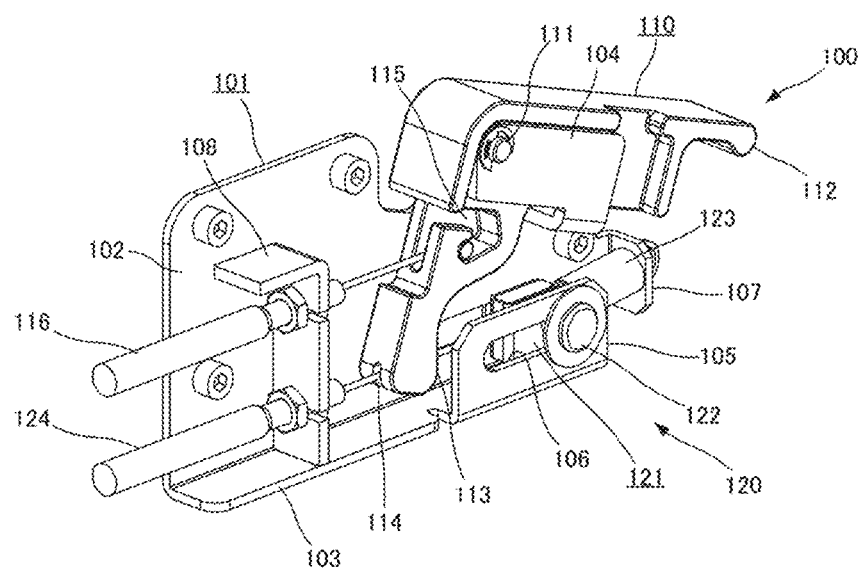
FIG. 1 is a perspective view showing a reclining operation unit of a seat device according to an embodiment of the present invention.
Figure 1:
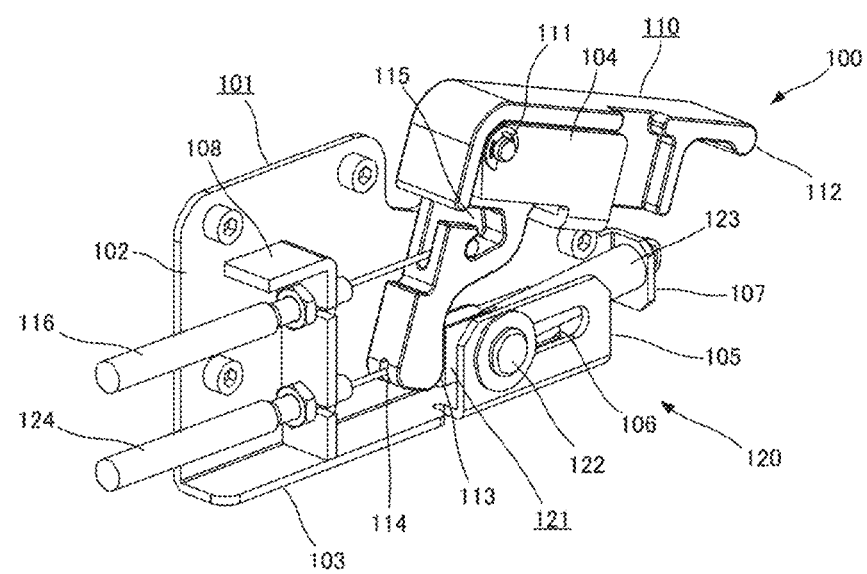
Figure 2:
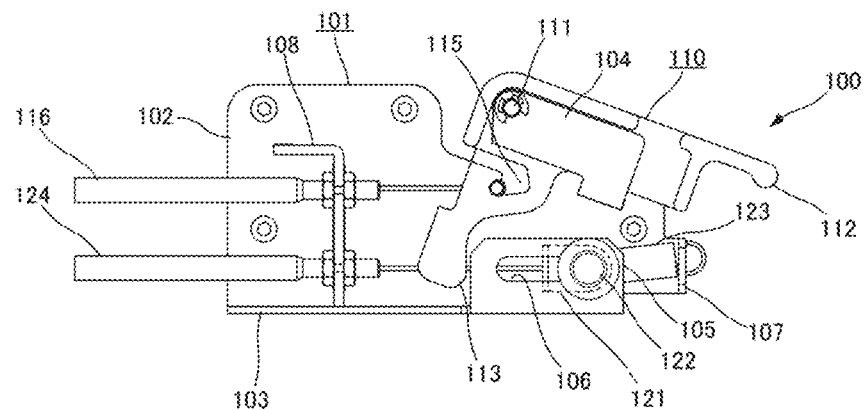
FIG. 2 is a side view showing the reclining operation unit of the seat device according to the embodiment of the present invention.
Figure 2:
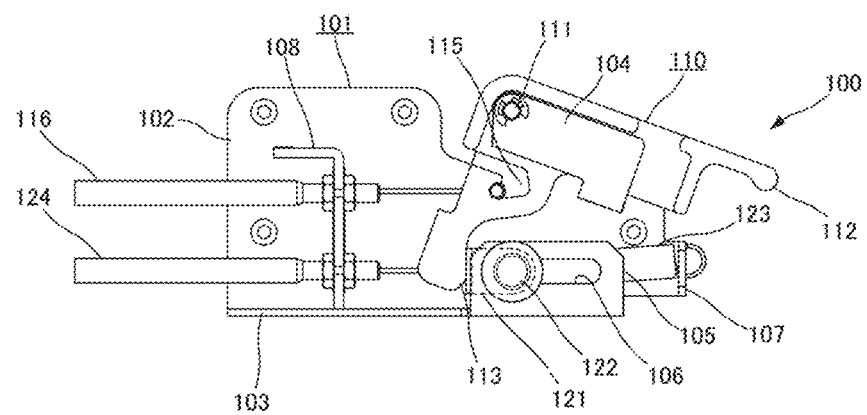

FIG. 1 is a perspective view of the reclining operation unit 100, FIG. 1(a) shows a state where the operation lever 110 is not restrained (hereinafter "the unrestrained state"), and FIG. 1(b) shows a state where the operation lever 110 is restrained (hereinafter "the restrained state"). FIG. 2 is a side view of the reclining operation unit 100, FIG. 2(a) shows the unrestrained state of the operation lever 110, and FIG. 2(b) shows the restrained state of the operation lever 110.

Figure 3:
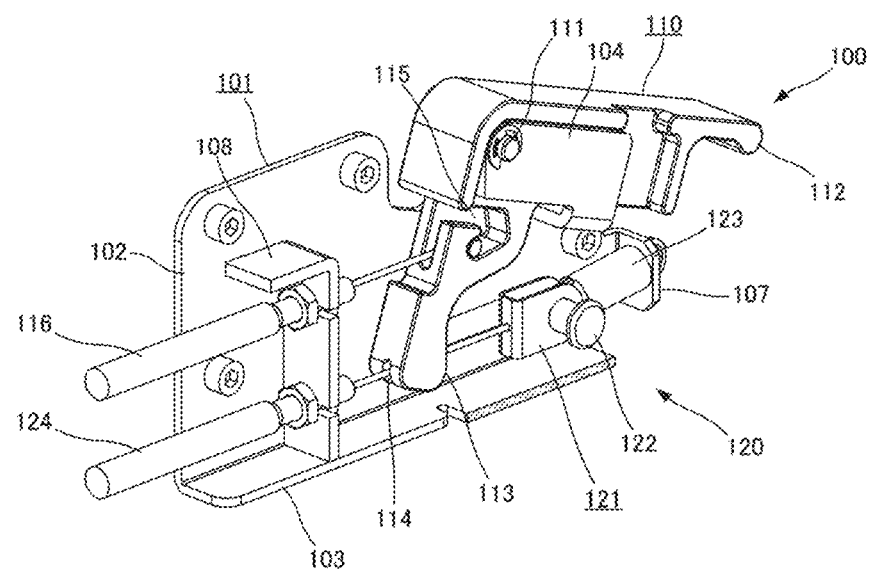
FIG. 3 is a perspective view showing the reclining operation unit of the seat device according to the embodiment of the present invention, with a part of the reclining operation unit being omitted.
Figure 3:
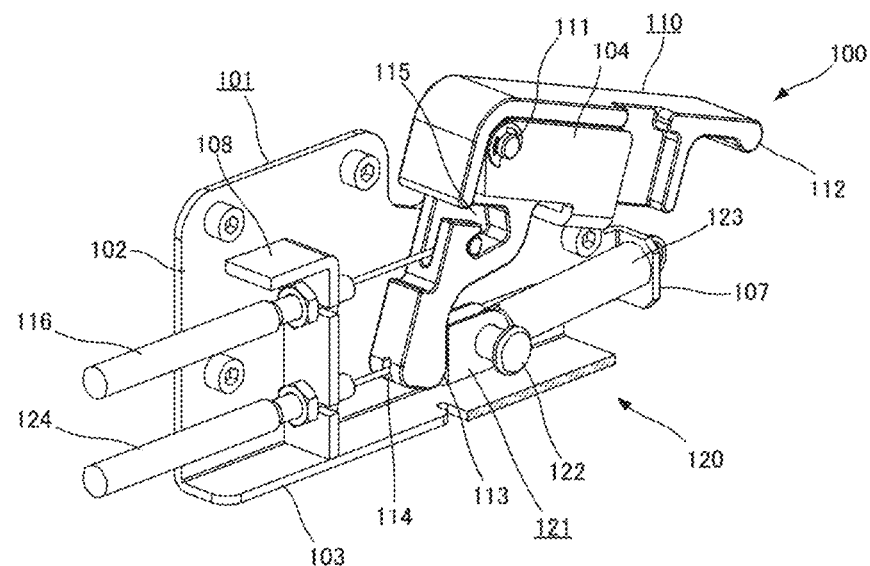
Figure 4:
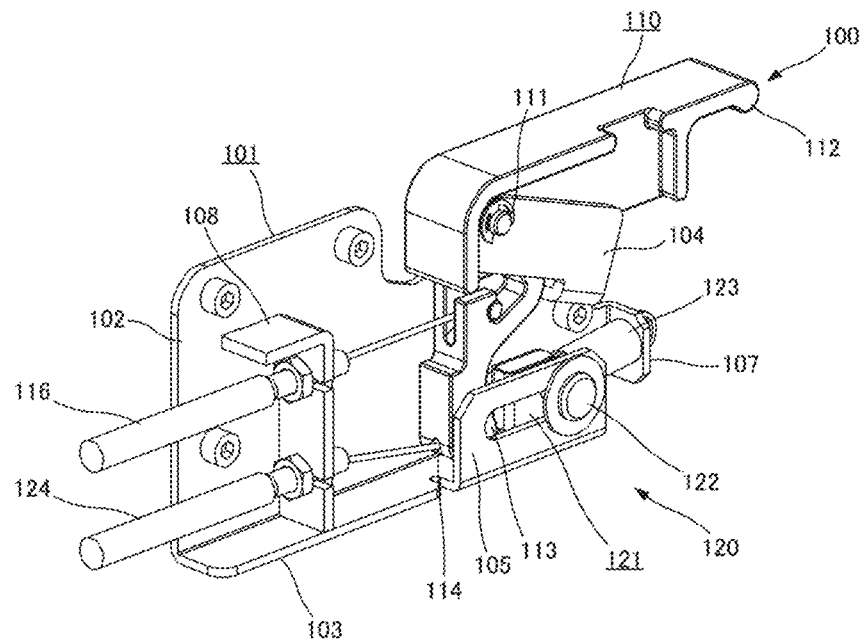
FIG. 4 is a perspective view and a side view showing the reclining operation unit of the seat device according to the embodiment of the present invention.
Figure 4:
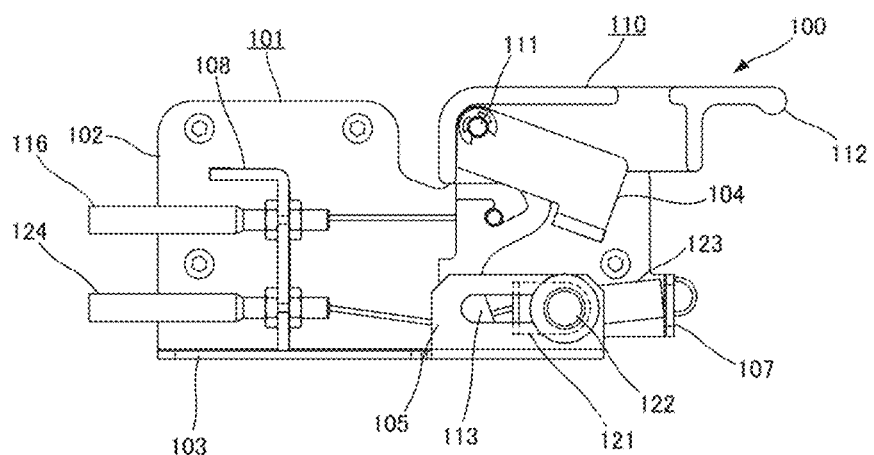

FIG. 3 is a perspective view of the reclining operation units 100, with a part (flange 105) of the reclining operation unit 100 being omitted, FIG. 3(a) shows the unrestrained state of the operation lever 110, and FIG. 3(b) shows the restrained state of the operation lever 110. FIG. 4 shows an operation position at which the operation lever 110 of the reclining operation unit 100 is lifted, FIG. 4(a) is a perspective view, and FIG. 4(b) is a side view. Note that, as shown in FIG. 1 to FIG. 4, the reclining operation unit 100 is provided with a reclining operation lock mechanism 120.

As shown in FIG. 1 to FIG. 4, the reclining operation unit 100 is unitized by incorporating each part in one housing 101, and is incorporated inside a front end of the armrest 5 (to be precise, an upper end side of the sleeve portion 4) as shown in FIG. 5. The reclining operation unit 100 performs an operation (reclining operation) for tilting the backrest 3 by the reclining mechanism 50. The housing 101 is a metal member having a long shape in front and back directions as shown, and a bottom wall 103 is bent at a right angle along a lower end edge of a side wall 102.

The reclining operation unit 100 includes the operation lever 110 swingably supported by the housing 101. The side wall 102 of the housing 101 is provided with a supporting wall 104 that is parallel to the side wall surface 102. The operation lever 110 is swingably supported at a substantially center of the entire housing 101, which is a rear end side of the supporting wall 104, via an axis 111 extending in horizontal directions on a horizontal plane.

The operation lever 110 is formed into a substantially L-shape, and one end side serves as an operation unit 112 that is operated by a seated person with fingers, with the axis 111, at which the substantially middle of the operation lever 110 is pivotably supported, serving as an oscillation center. The operation unit 112 is arranged toward the front of the seat 1, and is swung mainly in the vertical direction. The other end side, which is located on the other side of the oscillation center with respect to the operation unit 112, is provided with an abutting portion 113 that is engaged with and released from a stopper 121, which will be described later. The abutting portion 113 is arranged in a downward direction, and is swung mainly in the front and back directions. A concave groove 114 is provided in a lower portion of the abutting portion 113, and one end side of a reclining lock cable 124, which will be described later, is inserted into the concave groove 114.

The operation lever 110 is set to oscillate (displace) from an ordinary initial position at which the operation unit 112 faces downward and the abutting portion 113 becomes closer to the rear as shown in FIG. 2(a) to an operation position at which the operation unit 112 is pulled upward and the abutting portion 113 becomes closer to the front at the time of the reclining operation as shown in FIG. 4(b). Additionally, a hanging groove 115 to which one end side of a reclining operation cable 116 is connected is provided between the oscillation center (axis 111) and the other end side (abutting portion 113) of the operation lever 110.

The other end side of the reclining operation cable 116 extends to a release button 54 side (see FIG. 7) of the reclining mechanism 50, although an illustration is omitted. Here, by pulling the operation lever 110 upward to the operation position, a link (not shown) on the release button 54 side is pulled via the reclining operation cable 116 and the release button 54 is pressed, so that the locked state of the damper 51 is released. Note that the operation lever 110 is normally pulled by the reclining operation cable 116 to be held at the initial position.

<Reclining Operation Lock Mechanism 120>

The reclining operation unit 100 is provided with the reclining operation lock mechanism 120 that can restrain the reclining operation unit 100 to disable the operation. The reclining operation lock mechanism 120 restrains the reclining operation unit 100 to disable the operation, when the seat 1 is in the long state (specific state), which will be described later. Note that the reclining operation lock mechanism 120 is an example of "a lock mechanism" of the present invention.

As shown in FIG. 1 to FIG. 4, the reclining operation lock mechanism 120 includes the stopper 121 that is engaged with and released from the abutting portion 113 of the operation lever 110, when the operation lever 110 of the reclining operation unit 100 is in the initial position. The stopper 121 is supported on the bottom wall 103 of the housing 101 at a position closer to the front, so as to linearly move in the front and back directions of the seat 1.

The stopper 121 is formed from, for example, a metal spinning-top-shaped member, and is supported at a position closer to the front of the bottom wall 103, so as to linearly move in the front and back directions on the bottom wall 103, which is a substantially horizontal plane, along the flange 105 that rises parallel to the side wall 102. Here, the flange 105 is provided with a guide groove 106 to which an axis 122 protruding from a side of the stopper 121 movably fits, and by which the axis 122 is guided. Note that the stopper 121 is located between the operation unit 112 and the abutting portion 113 of the operation lever 110 in plan view.

The one end side of the reclining lock cable 124, which is pulled when the seat 1 is converted into the long state (specific state) described later, is connected to the stopper 121 from behind. The one end side of the reclining lock cable 124 is linearly routed to extend in the same direction as the direction in which the stopper 121 is linearly moved. Here, the one end side of the reclining lock cable 124 extends forward while being inserted into the concave groove 114 in the abutting portion 113 of the operation lever 110, and is directly connected to a backside of the stopper 121 located ahead of the abutting portion 113.

On the other hand, the other end side of the reclining lock cable 124 extends to a rotation operation unit 200 side, which will be described later. The reclining lock cable 124 is set to be pulled from the rotation operation unit 200 side, when the seat 1 is in the specific state (the long state described later). When the stopper 121 is directly pulled by the reclining lock cable 124, the stopper 121 is linearly moved from an ordinary unrestrained position (see FIG. 1(*a*)) at which the stopper 121 is released from the abutting portion 113 of the operation lever 110 to a restrained position (see FIG. 1(*b*)) at which the stopper 121 is engaged with the abutting portion 113. Note that the reclining lock cable 124 is an example of "a cable" of the present invention.

A spring member 123 is stretched between a front side of the stopper 121 and a front end piece 107 of the housing 101 located ahead of the stopper 121. The spring member 123 urges the stopper 121 to the ordinary unrestrained position. As shown in FIG. 1(*a*), when the stopper 121 is at the unrestrained position, i.e., a forefront end of a linear moving range, the swing of the operation lever 110 is not restrained, and as shown in FIG. 4, the reclining operation is enabled that causes the operation unit 112 of the operation lever 110 to swing to an upper operation position. Note that the spring member 123 is an example of "biasing means" of the present invention.

When the reclining lock cable 124 is pulled, the stopper 121 is linearly moved backward to the restrained position, i.e., a rear end of the linear moving range, against the biasing force of the spring member 123 as shown in FIG. 1(*b*). Accordingly, since a rear end surface of the stopper 121 is engaged with the abutting portion 113 of the operation lever 110, the operation lever 110 remains at the ordinary initial position, cannot swing the operation unit 112 upward, and is restrained to disable the operation. Note that the supporting wall 104 of the housing 101 serves to define the initial position of the operation lever 110.

Additionally, the reclining lock cable 124 is formed by slidably inserting an inner cable into an outer cable, an end of the outer cable is fixed to a bracket 108 provided on a rear end side of the side wall 102 of the housing 101, and the inner cable, which forms the one end side of the reclining lock cable 124, extends to the stopper 121 ahead of the bracket 108. In addition, similarly, the reclining operation cable 116 is also formed by slidably inserting an inner cable into an outer cable, an end of an outer cable is fixed to the bracket 108, and the inner cable, which forms the one end side of the reclining operation cable 116, extends to the hanging groove 115 of the operation lever 110.

<Regarding State of Seat 1>

FIG. 15 is an explanatory diagram showing the process of converting the seat 1 into the long state, a one cross state, and a reverse cross state. The seat device 10 can convert the state of the seat 1 between the long state (refer to FIG. 9 and FIG. 6) in which the back of the seat is substantially parallel to and along a wall A, and a cross state (refer to FIG. 5) in which the back of the seat is substantially orthogonal to the wall A. Here, for the cross state, there are one cross state (refer to FIG. 5), and a reverse cross state that is 180 degrees in the opposite direction to the one cross state.

As shown in FIG. 15, when it is assumed that the long state of the seat 1 has a rotation angle of 0 degrees as an original position, the rotation angle of the one cross state is 90 degrees, and the rotation angle of the reverse cross state is −90 degrees. Note that the back of the seat is synonymous with the back of the backrest 3. Hereinafter, when collectively referring to the cross state and the reverse cross state, they are merely written as the cross state.

<Leg Stand 11>

As shown in FIG. 10, the leg stand 11 is fixed onto the floor surface near the wall A in the cabin. The leg stand 11 is formed by combining frame members into the shape of a stand that is long in the direction (front and back direction) substantially orthogonal to the wall A. Although an upper surface side of the leg stand 11 is substantially horizontal, and this upper surface side is surrounded by both side ends 12 and 12, forming the long sides, and a rear end portion, forming a short side on the rear side (wall A side), the front side (aisle side) is opened.

The leg stand 11 is arranged so that its rear end portion is close to and substantially parallel to the wall A, and both side ends 12 and 12 are substantially orthogonal to the wall A and extend toward the aisle side. Note that, in addition to the sliding mechanism 14, which will be described next, related parts such as a stopper for regulating the advance and retract range and the rotation direction of the underframe 30 are provided in the upper surface side of the leg stand 11.

<Sliding Mechanism 14>

As shown in FIG. 10, the movable stand 20 is attached to the upper surface side of the leg stand 11 via the sliding mechanism 14, so as to be able to advance and retract in the direction substantially orthogonal to the wall A. The sliding mechanism 14 includes a pair of guide rails 14*a* and 14*a* that are provided inside both side ends 12 and 12 of the leg stand 11. A pair of guide rails 14*a* and 14*a* are parallel to and oppose to each other along the inside of both side ends 12 and 12 of the leg stand 11, and both side portions 21 and 21 of the movable stand 20, which will be described next, directly and slidably fit inside the respective guide rails 14*a*.

<Movable Stand 20>

As shown in FIG. 10, the movable stand 20 is substantially horizontally arranged on the upper surface side of the leg stand 11, and is formed by combining frame members into a rectangular framework shape. Both side ends 21 and 21, forming the long sides of the movable stand 20, slidably fit inside the aforementioned pair of guide rails 14*a* and 14*a*. Thus, the movable stand 20 can be slid so as to advance or retract in the direction substantially orthogonal to the wall A. The rotation mechanism 40 that rotates the seat 1 about the rotation axis is provided at a substantially center of the movable stand 20.

<Rotation Mechanism 40>

The rotation mechanism 40 supports the underframe 30 of the seat 1 on the movable stand 20 so as to be rotatable in the forward and backward directions in a substantially horizontal plane. The rotation mechanism 40 is formed as a unit in which, for example, a pair of inner and outer ring-shaped turntables are rotatably combined with each other by interposing a bearing, etc. between them. In this rotation mechanism 40, the outer turntable is fixed to the moving table 20, and the inner turntable is fixed to the underframe 30.

The rotation axis, which serves as the rotation center of the seat 1, is the center line of the rotation mechanism 40, and does not have a physical substance in the present embodiment. As shown in FIG. 8, the rotation mechanism 40 includes a motor 41, which is a power source. The motor 41 is provided with a reducer, and a drive gear in its output axis is rotatably engaged with a sprocket 42 centered on the rotation axis provided in the underframe 30 side. Note that the rotation mechanism 40 also allows the seat to be manually rotated.

<Underframe 30>

As shown in FIG. 10, the seat 1 is attached to the underframe 30, and the underframe 30 is supported by the rotation mechanism 40 on the movable stand 20. The underframe 30 is formed by, for example, a metal plate that corresponds to a bottom surface of the seating portion 2. Although described above, the sprocket 42 with which the drive gear of the motor 41 rotatably engages is integrally provided in the bottom surface side of the underframe 30.
<Interlocking Mechanism>

Additionally, the seat device 10 includes an interlocking mechanism (not shown) that interlocks the rotation and advancement and retraction of the seat 1, so that the seat 1 does not interfere with the wall A, when converting the seat 1 to the long state, the one cross state, and the reverse cross state. Note that the long state corresponds to "the specific state of the seat 1" of the present invention.

When the seat 1 is rotated with the underframe 30, the interlocking mechanism converts the rotation of the underframe into linear motion, transmits the linear motion to the movable stand 20, and makes the movable stand 20 move in a linear direction so as to be close to or separated from the wall A together with the underframe 30. Although the kind of such an interlocking mechanism is not particularly limited, specifically, for example, the invention already proposed by the present applicant and described in Japanese Patent Laid-Open No. 2018-187971 may be utilized, or, although not published, the invention proposed in Japanese Patent Application No. 2019-239066, etc. may be utilized.
<Rotation Lock Mechanism 60>

Figure 13:
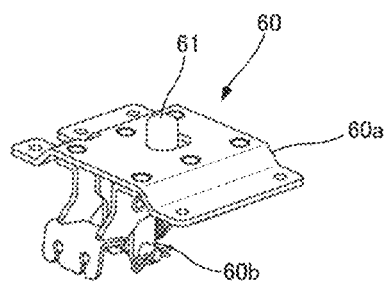
FIG. 13 is a perspective view showing a rotation lock mechanism of the seat device according to the embodiment of the present invention.
Figure 14:
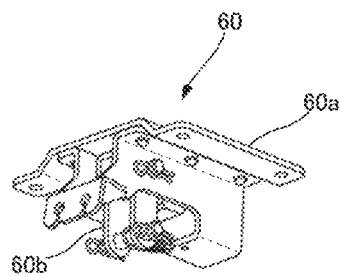
FIG. 14 is a perspective view showing the rotation lock mechanism of the seat device according to the embodiment of the present invention.

FIG. 13 is a perspective view showing a rotation lock mechanism 60. FIG. 14 is a perspective view showing a state where the rotation lock mechanism 60 is seen from the bottom.

As shown in FIG. 10, the seat device 10 includes a rotation lock mechanism 60 that unrotatably restrains the underframe 30 (seat) in each rotation position of the long state, the one cross state, and the reverse cross state. Since the rotation lock mechanism 60 unrotatably locks the underframe to the leg stand 11, the movable stand 20 is also inevitably restrained to the leg stand 11 so as not to be able to advance and retract.

The rotation lock mechanism 60 includes a lock pin 61 that can protrude up and down from the leg stand 11 side to the underframe 30, and locking holes 62a, 62b, and 62c that are provided in the underframe 30, and with and from which the lock pin 61 are engaged and released. A total of three locking holes 62a, 62b, and 62c are provided in a long side along the back of the seat, and both short sides along the seat of the substantially rectangular underframes 30, respectively.

The lock pin 61 is incorporated in a unit 60a, and the unit is fixed near the rear end of the upper surface side of the leg stand 11. The lock pin 61 is operated between a lock position at which the lock pin 61 can protrude upward from the upper surface side of the leg stand 11 to project upward and fit into the locking holes 62a, 62b, and 62c, and a lock release position at which the lock pin 61 retracts downward to be released from the locking holes 62a, 62b, and 62c.

When the seat 1 is converted into the long state, the one cross state, and the reverse cross state, the lock pin 61 unrotatably restrains the seat 1 by fitting into the locking holes 62a, 62b, and 62c on the underframe 30 side to which the lock pin 61 vertically corresponds at the respective positions. That is, in the long state, the lock pin 61 fits into the locking hole 62a in one long side of the underframe 30. Additionally, in the one cross state, the lock pin 61 is inserted into and engaged with the locking hole 62b in one short side of the underframe 30. Furthermore, in the reverse cross state, the lock pin 61 fits into the locking hole 62c in the other short side of the underframe 30.

As shown in FIG. 13 and FIG. 14, the unit 60a in which the lock pin 61 is incorporated is provided with each of a spring member (not shown) that always urges the lock pin 61 to project upward to the lock position, and a link 60b that makes the lock pin 61 resist the biasing force of the spring member to retract to the downward lock release position. Here, one end side of a rotation operation cable 206 (see FIG. 11) for step operation is connected to the link 60b.

Figure 11:
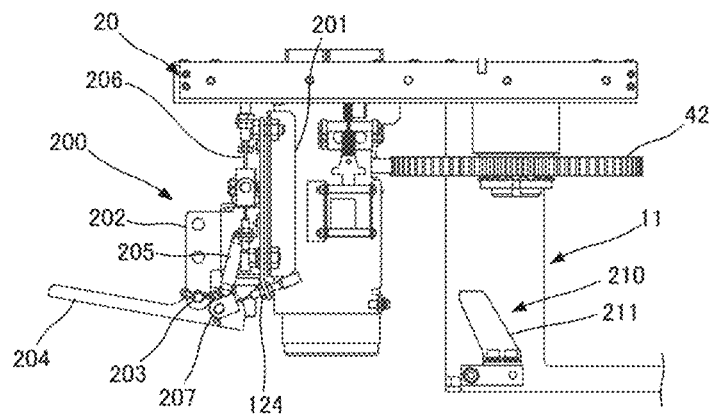
FIG. 11 is a side view showing a rotation operation unit of the seat device according to the embodiment of the present invention.

The lock pin 61 is configured to be normally maintained at a locking position by the biasing force of the spring member, and to retract to a lock release position against the biasing force of the spring member, when the link 60b is pulled by the rotation operation cable 206. As shown in FIG. 11, the other end side of the rotation operation cable 206 extends to the rotation operation unit 200 provided in the leg stand 11 side, which will be described later. Here, when the rotation operation cable 206 is pulled by the operation in the rotation operation unit 200, the restraint of the rotation lock mechanism is released.

Additionally, although illustration is omitted, one end side of a rotation operation cable for electric operation is also connected to the link 60b of the rotation lock mechanism 60. For example, the motor 41 of the rotation mechanism 40 also serves as the power source for pulling the rotation operation cable for electric operation. That is, the motor 41 includes a clutch, and is configured to be able to switch between an operation for rotating the seat by the rotation mechanism 40, and an operation for retracting the lock pin 61 to release the lock, by switching of the clutch. Note that a detailed description of the clutch of the motor 41 is omitted, since the configuration regarding the clutch of the motor 41 is common.

The rotation lock mechanism 60 according to the present embodiment is configured such that, when the seat 1 is in the long state, the restraint by the rotation lock mechanism 60 cannot be released by the step operation in the rotation operation unit 200, and can be released only by an electric operation by the motor 41. Here, the electric operation is performed by a crew or station employee of a vehicle, and the step operation is mainly performed by a passenger.
<Rotation Operation Unit 200>

Figure 12:
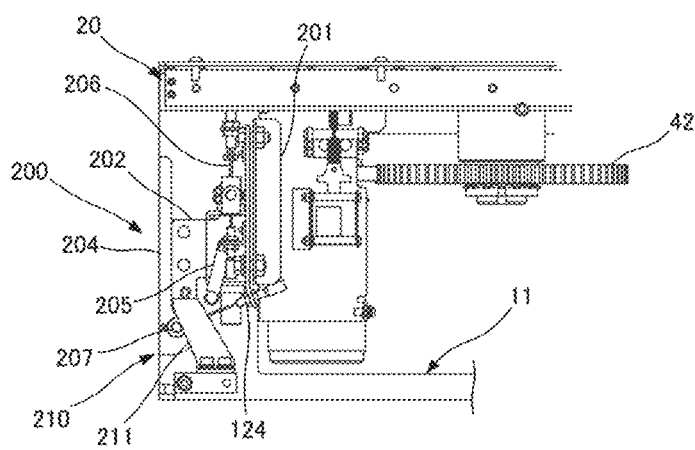
FIG. 12 is a side view showing the rotation operation unit of the seat device according to the embodiment of the present invention.

FIG. 11 is a side view showing a state where the rotation operation unit 200 is not restrained by the rotation operation prevention mechanism 210 to disable the operation. FIG. 12 is a side view showing a state where the rotation operation unit 200 is restrained by the rotation operation prevention mechanism 210 to disable the operation.

As shown in FIG. 5, the rotation operation unit 200 is unitized by incorporating each part in one housing 201, and is fixed to hang from a front end side of the movable stand 20.

As shown in FIG. 11, the rotation operation unit 200 includes a step pedal 204 swingably supported by a lower end of a supporting bracket 202 fixed to the inside of the housing 201 via an axis 203. A tip side of the step pedal 204 can be swung in the front and back directions, with the axis 203, to which its base end side is pivotably supported, being the rotation center.

The step pedal 204 is swung between a using position (refer to FIG. 11) at which the tip side protrudes forward of the housing 201, and a housing position (refer to FIG. 12) at which the tip side withdraws upward. The step pedal 204 is normally urged to protrude forward to be in the using position via the spring member 205. Here, when the step pedal 204 is in the using position, an operation of stepping on this to release the restraint by the rotation lock mechanism 60 is enabled, but when the step pedal 204 is in the housing position, the operation of releasing the restraint by the rotation lock mechanism 60 is disabled.

The base end side of the step pedal 204 is connected to the other end side of the rotation operation cable 206 for step operation extended to the rotation lock mechanism 60 side via a connector. Here, when the step pedal 204 in the using position is stepped downward, the rotation operation cable 206 is pulled and the lock pin 61 (refer to FIG. 13) is retracted downward, and the locked state of the rotation lock mechanism 60 is released.

Additionally, a pin-shaped engaged portion 207 projecting in both directions at a position eccentric from the axis 203 is fixed to the base end side of the step pedal 204. The engaged portion 207 is connected to the other end side of the reclining lock cable 124 extending from the reclining operation lock mechanism 120 side via a connector. Here, when the engaged portion 207 is engaged with an engaging portion 211, which will be described next, the reclining lock cable 124 is pulled, the stopper 121 of the reclining operation lock mechanism 120 is moved backward, and the reclining operation unit 100 is restrained to disable the operation.

<Rotation Operation Prevention mechanism 210>

Additionally, the rotation operation unit 200 is provided with a rotation operation prevention mechanism 210 that disables the release operation of the restraint by the rotation operation unit 200. The rotation operation prevention mechanism 210 disables the operation of the step pedal 204 when the seat 1 is in the long state. The long state here corresponds to a "the seat 1 is in a specific state" in the present invention.

As shown in FIG. 11 and FIG. 12, the rotation operation prevention mechanism 210 includes the engaging portion 211 provided in the leg stand 11, which is the fixed side of the seat 1, and the engaged portion 207 provided in the rotation operation unit 200 in the movable side of the seat 1. The engaging portion 211 is arranged in the front end of the bottom surface side of the leg stand 11, and is formed in, for example, a metal bracket shape that protrudes diagonally upward toward the front.

The engaged portion 207 is provided in the metal pin shape at the position eccentric from the axis 203 in the base end side of the step pedal 204 as described above. The engaged portion 207 is set to precisely engage with the engaging portion 211 when the seat 1 in the long state (specific state). Since the step pedal 204 is swung to be in the housing position against the biasing force of the spring member 205 when the engaged portion 207 is engaged with the engaging portion 211, the release operation in the rotation operation unit 200 is disabled. At the same time, the reclining operation unit 100 is restrained to disable the operation.

<Effects of Seat Device 10>

Hereinafter, effects of the seat device 10 according to the present embodiment will be described.

First, based on FIG. 15, the operation of converting the state of the seat 1 will be described. As shown in FIG. 15 (a), when the underframe 30 (seat 1) is in the long state, the rotation axis (rotation mechanism 40) of the underframe 30 is most retracted (close) to the wall A side. The long side of the underframe 30 (the back of the seat) is substantially parallel to and along the wall A, and the rotation angle is 0 degrees. At this time, as shown in FIG. 10, the lock pin 61 of the rotation lock mechanism 60 fits into the locking hole 62a in one long side of the underframe 30, and the underframe 30 (seat 1) is unrotatably restrained in the long state.

«Conversion from Long State to One Cross State»

As shown in FIG. 15(a) to FIG. 15(c), in order to convert the underframe 30 (seat 1) from the long state into the one cross state (the rotation angle 90 degrees), it is necessary to release the restraint of rotation by the rotation lock mechanism 60. The operation of disengaging the lock pin 61 from the locking hole 62a cannot be performed by an operation of the step pedal 204, and is performed by an electric operation utilizing the power of the motor 41.

In the long state shown in FIG. 15 (a), when the underframe 30 is rotated by the motor 41 to the forward direction (the counter clockwise direction in FIG. 15) as shown in FIG. 15 (b) after releasing the restraint by the rotation lock mechanism 60, the underframe 30 is rotated while moving forward by interlocking mechanism. That is, the underframe 30 is rotated while being rotated in the forward direction and moving forward to the aisle side, so as not to interfere with the wall A.

As shown in FIG. 15(c), when the underframe 30 reaches the one cross state (the rotation angle 90 degrees), in FIG. 10, the lock pin 61 of the rotation lock mechanism 60 fits into the locking hole 62b in one short side of the underframe 30. Accordingly, the underframe 30 (seat 1) is unrotatably restrained in the one cross state.

«Conversion from One Cross State to Reverse Cross State»

In the one cross state shown in FIG. 15(c), when the underframe 30 is rotated to the opposite direction (the clockwise direction in FIG. 15) after releasing the restraint of the rotation lock mechanism 60, the underframe 30 advances or retracts while, for example, being rotated by the interlocking mechanism. Subsequently, as shown in FIG. 15(d), in a state where the underframe 30 is temporarily held at the position to which the underframe 30 has advanced in a state parallel to the long state, the underframe 30 is directly rotated to the opposite direction without advancing and retracting.

As shown in FIG. 15 (e), when the underframe 30 reaches the reverse cross state (the rotation angle −90 degrees), the lock pin 61 of the rotation lock mechanism 60 fits into the locking hole 62c in the other short side of the underframe 30, and the underframe 30 is restrained again to disable the rotation. Such conversion from the one cross state to the reverse cross state of the seat 1 can be performed not only by the step operation of the step pedal, but also by the electric operation of the motor 41. Note that, in order to return the seat 1 from the reverse cross state to the one cross state, and further from the one cross state to the original long state, the inverse operations of the aforementioned conversion from the long state to the one cross state, and from the one cross state to the reverse cross state may be performed, respectively.

«Restraint of Reclining Operation of Backrest 3»

When the seat 1 is in the long state, the reclining operation in the reclining operation unit 100 is disabled by the reclining operation lock mechanism 120. That is, when the seat 1 is converted into the long state, as shown in FIG. 12, the engaged portion 207 is engaged with the engaging portion 211 in the leg stand 11 to be displaced. Here, the engaged portion 207 is displaced in a direction that causes the step pedal 204 to swing upward by using the axis 203 as a rotation center. With displacement of the engaged portion 207, the reclining lock cable 124 connected to the engaged portion 207 is pulled.

In FIG. 1(a), when the reclining lock cable 124 is pulled, the stopper 121 is linearly moved from the unrestrained position at which the stopper 121 is released from the abutting portion 113 of the operation lever 110 to the restrained position at which the stopper 121 is engaged with the abutting portion 113 against the biasing force of the spring member 123 as shown in FIG. 1(*b*). Accordingly, the operation lever 110 remains at the ordinary initial position, cannot cause the operation unit 112 to swing upward, is restrained to disable the operation, and cannot tilt the backrest 3 by the reclining mechanism 50.

With the reclining operation lock mechanism 120 as described above, in the long state, it is possible to reliably prevent the reclining operation of the backrest 3 by a seated person, and to prevent the backrest 3 from being carelessly tilted to interfere with the wall A. The reclining operation lock mechanism 120 may only have the stopper 121 that is directly pulled by the reclining lock cable 124, and it becomes unnecessary to have a special mechanism, such as a link for linearly moving the stopper 121.

Accordingly, the number of parts of the reclining operation lock mechanism 120 is reduced so that the configuration is also simplified and downsized, and it becomes possible to reduce the cost and the arrangement space. Additionally, the stopper 121 is not indirectly pulled by the reclining lock cable 124 via another member such as a link, but is directly connected to and is directly pulled by the reclining lock cable 124. Therefore, there is no risk that pulling becomes insufficient due to deterioration of members other than the reclining lock cable 124, and the stopper 121 can be reliably moved.

Moreover, the stopper 121 is linearly moved in the front and back directions on the substantially horizontal bottom wall 103 of the housing 101. Additionally, the reclining lock cable 124 directly connected to the stopper 121 also linearly extends in the same direction on the same horizontal plane on which the stopper 121 is linearly moved. Accordingly, the reclining operation lock mechanism 120 does not have a configuration and an operation that are bulky in the vertical direction, and can significantly suppress the height dimension. Therefore, it becomes possible to add, on the upper end side of the sleeve portion 4, the armrest 5 having a thickness that corresponds to the amount of reduction of the size of the reclining operation lock mechanism 120 in the vertical direction.

«Release of Restriction of Reclining Operation of Backrest 3»

When the seat 1 is converted into the cross state, the restraint of the reclining operation unit 100 by the reclining operation lock mechanism 120 to disable the operation is released. That is, in the cross state of the seat 1, as shown in FIG. 11, the engaged portion 207 of the step pedal 204 in the movable stand 20 is not engaged with and is separated from the engaging portion 211 in the leg stand 11. Thus, the step pedal 204 protrudes forward to be in the using position by the biasing force of the spring member 205, and the reclining lock cable 124 is in a state where the reclining lock cable 124 is not pulled.

Then, as shown in FIG. 1(*a*), in the reclining operation lock mechanism 120, the stopper 121 is linearly moved forward to the unrestrained position at which the stopper 121 is released from the abutting portion 113 of the operation lever 110 by the biasing force of the spring member 123. Accordingly, the restraint of the operation lever 110 to disable the operation is released, and the reclining operation is enabled. That is, as shown in FIG. 4, a seated person can perform the reclining operation that causes the operation unit 112 of the operation lever 110 to swing upward, can tilt the backrest 3 to an arbitrary angle, and can improve seating comfort.

Note that, when the operation unit 112 of the operation lever 110 is swung to the upper operation position, the middle of the reclining lock cable 124 that penetrates through the concave groove 114 of the abutting portion 113 is pressed downward. This displacement of the reclining lock cable 124 is set to be within a range that is absorbed by play of the reclining lock cable 124. Accordingly, the operation of the rotation operation unit 200 that is located ahead of the reclining lock cable 124 is not affected.

«Restraint of Rotation Operation of Seat 1»

As shown in FIG. 10, when the seat 1 is in the long state, the underframe 30 is restrained to disable the rotation with respect to the movable stand 20 by the rotation lock mechanism 60. That is, the lock pin 61 of the rotation lock mechanism 60 fits into the locking hole 62*a* in the one long side of the underframe 30. Here, since the lock pin 61 protrudes from the leg stand 11, which is the fixed side of the seat 1, the seat 1 is not only restrained to disable the rotation, but also simultaneously restrained to disable advancement and retraction.

As shown in FIG. 6, when the seat 1 is in the long state, the release operation in the rotation operation unit 200 is disabled by the rotation operation prevention mechanism 210. That is, in the long state, the movable stand 20 is most retracted (close) to the wall A side, and the front end side of the movable stand 20 overlaps with the front end side of the leg stand 11. With this positional relationship, as shown in FIG. 12, the engaged portion 207 of the step pedal 204 in the movable stand 20 is engaged with the engaging portion 211 in the leg stand 11. Then, the step pedal 204 is swung to be in the housing position at which the step pedal 204 is upright against the biasing force of the spring member 205, and is restrained in the housing position.

Accordingly, when the seat 1 is in the long state, the step pedal 204 is not only displaced to the housing position at which the operation is disabled, but also firmly held in the housing position by the engagement relationship between the engaging portion 211 and the engaged portion 207. Thus, in the long state, the release operation in the rotation operation unit 200 is disabled. With such a simple configuration, the rotation operation of the seat 1 by a seated person can be reliably prevented in the long state.

«Release of Restriction of Rotation Operation of Seat 1»

When the seat 1 is in the cross state, the restraint to disable the operation of the rotation operation unit 200 by the rotation operation prevention mechanism 210 is also released. That is, in the cross state shown in FIG. 15 (*c*), the movable stand 20 is most advanced (separated) from the wall A side, and the front end side of the movable stand 20 is located farther forward from the front end side of the leg stand 11. In this positional relationship, as shown in FIG. 11, the engaged portion 207 of the step pedal 204 in the movable stand 20 is not engaged with and separated from the engaging portion 211 in the leg stand 11. Thus, the step pedal 204 protrudes forward to be in the using position by the biasing force of the spring member 205.

At this time, the seated person of the seat 1 can release the restraint by the rotation lock mechanism 60 by stepping on the step pedal 204. That is, in FIG. 11, when the step pedal 204 is stepped on to be swung downward, the rotation operation cable 206 is pulled, the lock pin 61 (refer to FIG. 13) is retracted downward, and the locked state of the rotation lock mechanism 60 is released. Accordingly, the seated person can manually rotate the seat 1.

<Configuration and Effects of Present Invention>

Although the embodiment of the present invention has been described above, the present invention is not limited to the aforementioned embodiment. The present invention derived from the aforementioned embodiment will be described below.

First, the present invention is the seat device 10 that can convert the state of the seat 1, including
- the reclining mechanism 50 that can tilt the backrest 3 of the seat 1,
- the operation unit 100 that performs the operation of tilting the backrest 3 by the reclining mechanism 50,
- the lock mechanism 120 that restrains the operation unit 100 to disable the operation when the seat 1 is in the specific state, and
- the cable 124 that is pulled in conjunction with the conversion into the specific state of the seat 1,
- wherein the operation unit 100 can be displaced from the ordinary initial position to the operation position at a time of the operation,
- the lock mechanism 120 includes the stopper 121 that is linearly moved to be engaged with and released from the operation unit 100 in the initial position, and
- the stopper 121 is linearly moved from the ordinary unrestrained position at which the stopper 121 is directly pulled by the cable 124 to be released from the operation unit 100 to the restrained position at which the stopper 121 is engaged with the operation unit 100 to disable the operation.

In the lock mechanism 120 as described above, the stopper 121 is directly pulled by the cable 124, and is linearly moved to the restrained position at which the stopper 121 is engaged with the operation unit 100 of the reclining mechanism 50 to disable the operation. Therefore, a special mechanism, such as a link, for moving the stopper 121 is no longer required, the number of parts is reduced so that the configuration is also simplified and downsized, and it becomes possible to reduce the cost and the arrangement space.

Moreover, the stopper 121 is not indirectly pulled by the cable 124 via another member such as a link, but is directly connected to and is directly pulled by the cable 124. Therefore, there is no risk that pulling becomes insufficient due to deterioration of members other than the cable 124, and the stopper 121 can be reliably moved.

Additionally, as the present invention,
- the stopper 121 is supported in a state where the stopper 121 is linearly moved in the front and back directions of the seat 1 on a substantially horizontal plane.

Accordingly, the reclining operation lock mechanism 120 does not have a configuration and an operation that are bulky in the vertical direction, and can significantly suppress the height dimension. Accordingly, it is possible to further respond to a request of space-saving in the arrangement space of, for example, the sleeve portion 4 (armrest 5) or the like to which the reclining operation lock mechanism 120 is attached, and the design freedom can also be increased.

Additionally, as the present invention,
- the stopper 121 is normally held at the unrestrained position by the biasing means 123, and when the stopper 121 is pulled by the cable 124, the stopper 121 is linearly moved to the restrained position against the biasing force of the biasing means 123, and is held at the restrained position.

By holding the stopper 121 at the unrestrained position by the biasing force of the biasing means 123 in this manner, it is possible to easily maintain the stopper 121 at the unrestrained position with a simple configuration, without using power. Additionally, it is possible to reliably hold the stopper 121 at the restrained position by easily and linearly moving the stopper 121 to the restrained position against the biasing force of the biasing means 123, only by pulling the cable 124.

Additionally, as the present invention,
- the operation unit 100 includes the operation lever 110 that is swingably supported between the initial position and the operation position at the front end side of the armrest 5 in the seat 1,
- the operation lever 110 is provided with the abutting portion 113 that is engaged with and released from the stopper 121, the abutting portion 113 being provided on an other end side of the operation lever 110, which is on the other side of the oscillation center with respect to the one end side of the operation lever 110 to be operated, and
- the cable 124 is routed in the state where a straight portion of the one end side of the cable 124 penetrates through the abutting portion 113 of the operation lever 110, and is directly connected to the stopper 121 arranged ahead of the abutting portion 113.

Since the operation unit 100 of the reclining mechanism 50 includes the operation lever 110 on the front end side of the armrest 5 in the seat 1 in this manner, a seated person can easily operate the operation lever 110 while remaining seated. The one end side of the operation lever 110 serves as the portion (operation unit 112) to be operated, and the other end side serves as the abutting portion 113 to be engaged with and released from the stopper 121, with the oscillation center being between the one end side and the other end side. The cable 124 is routed in the state where the cable 124 penetrates through the abutting portion 113 (concave groove 114) of the operation lever 110, and is directly connected to the stopper 121 located ahead of the abutting portion 113.

With this configuration, the stopper 121 is arranged between the one end side and the other end side of the operation lever 110, and the cable 124 is arranged so as to overlap with the other end side of the operation lever 110. Therefore, it becomes possible to generally more compactly form the operation unit 100 and the lock mechanism 120. Here, it also becomes possible to reliably move the stopper 121 with a small force by matching the direction in which the stopper 121 is pulled and the direction in which the stopper 121 is linearly moved.

Additionally, the present invention includes
- the rotation mechanism 40 that rotates the seat 1 about the rotation axis, and
- the sliding mechanism 14 that causes the seat 1 to advance and retract from the fixed side, together with the rotation mechanism 40,
- wherein by interlocking of the rotation mechanism 40 and the sliding mechanism 14, the state of the seat 1 can be converted into
- a long state where a back of the seat 1 is substantially parallel to and along the wall, and
- a cross state where the back of the seat 1 is separated from the wall in the orientation substantially orthogonal to the long state, and
- the specific state of the seat 1 is the long state.

Accordingly, as described in the aforementioned embodiment, it becomes possible to directly apply the present seat device 10 to general stool-type rotary seats mounted in railroad cars. Then, since the back of the backrest 3 is close to and substantially parallel to the wall A when the seat 1 is in the long state, as described above, it is necessary to restrain the operation unit 100 of the reclining mechanism 50 to disable the operation by the lock mechanism 120.

Further, the present invention includes the leg stand 11 that is the fixed side of the seat 1, the movable stand 20 supported by the leg stand 11 so as to be able to advance and retract via the sliding mechanism 14, the seat 1 being rotatably supported by the movable stand 20 via the rotation mechanism 40, the engaging portion 211 provided in the leg stand 11, and the engaged portion 207 provided in the movable stand 20, the engaged portion 207 being engaged with the engaging portion 211 to be displaced when the seat 1 is in the long state, wherein the engaged portion 207 and the stopper 121 are connected by the cable 124, and the cable 124 is pulled based on displacement of the engaged portion 207.

In this manner, according to the present seat device 10, it is possible to move the stopper 121 via the cable 124, due to the mechanical engagement relationship between the engaging portion 211 and the engaged portion 207. With such a simple configuration, the reclining operation can be regulated only in the long state, which is the specific state of the seat 1, without using electric power.

<Another Configuration and Effects of Present Invention>

Additionally, the following another invention is also derived from the aforementioned embodiment.

the seat device 10 that can convert the state of the seat 1, including the rotation lock mechanism 60 that can restrain the seat 1 at each of a plurality of rotation angles, the seat being rotatable about the rotation axis, the rotation operation unit 200 that performs the release operation of restraint by the rotation lock mechanism 60, and the rotation operation prevention mechanism 210 that disables the release operation in the rotation operation unit 200, when the seat 1 is in the specific state of one of the rotation angles, the rotation operation prevention mechanism 210 including the engaging unit 211 provided on the fixed side of the seat 1, and the engaged unit 207 that is provided in the rotation operation unit 200 on the movable side of the seat 1, and disables the release operation in the rotation operation unit 200 by being engaged with the engaging unit 211 when the seat 1 is in the specific state.

In the present seat device 10, when the seat 1 is in the long state, which is the specific state, although the back of the seat is close to the wall A, the rotation of the seat 1 by a seated person is disabled, so that a passenger cannot freely change the position. Here, it is necessary to release the restraint by the rotation lock mechanism 60 by the rotation operation unit 200 for rotating the seat 1. Therefore, the rotation of the seat 1 can be disabled by disabling the operation of the rotation operation unit 200 by the rotation operation prevention mechanism 210.

In the rotation operation prevention mechanism 210, when the seat 1 is in the long state, the release operation of the rotation operation unit 200 is disabled by engaging the engaged portion 207 in the rotation operation unit 200 on the movable side of the seat 1 with the engaging portion 211 in the fixed side of the seat 1. With such a mechanical engagement relationship between the engaging portion 211 and the engaged portion 207, the rotation of the seat 1 by a seated person can be disabled only when the seat 1 is in the long state, with a simple configuration, and without using electric power.

Although the embodiments have been described above with the drawings, the specific configuration is not limited to these embodiments, and even when there are modification and addition in the scope not departing from the gist of the present invention, they are included in the present invention. For example, although the example of the seat 1 for two persons has been described, the seat 1 may be for three persons or one person.

Additionally, the specific shapes of the operation lever 110 of the reclining operation unit 100 and the stopper 121 of the reclining operation lock mechanism 120 are not limited to those shown. In addition, the specific shapes of the leg stand 11, the movable stand 20, and the underframe 30 are not limited to those shown, either. Furthermore, the conversion of the state of the seat is not limited to the long state, the one cross state, and the reverse cross state.

INDUSTRIAL APPLICABILITY

The present invention can be widely utilized as a seat device for chairs for theaters, home, and office, in addition to the seat for vehicles installed in cabins of railroad cars, airplanes, automobiles, marine vessels, etc.

REFERENCE SIGNS LIST

10 . . . device
11 . . . Leg stand
14 . . . Sliding mechanism
20 . . . Movable stand
30 . . . Underframe
40 . . . Rotation mechanism
50 . . . Reclining mechanism
60 . . . Rotation lock mechanism
100 . . . Reclining operation unit
110 . . . Operation lever
111 . . . Axis
112 . . . Operation unit
113 . . . Abutting portion
116 . . . Reclining operation cable
120 . . . Reclining operation lock mechanism
121 . . . Stopper
122 . . . Axis
123 . . . Spring member
124 . . . Reclining lock cable
200 . . . Rotation operation unit
204 . . . Step pedal
207 . . . Engaged portion
210 . . . Rotation operation prevention mechanism
211 . . . Engaging portion

What is claimed is:

1. A seat device that can convert a state of a seat disposed in a vehicle, comprising:

a reclining mechanism that can tilt a backrest of the seat;

an operation unit that enables or disables an operation of the reclining mechanism to tilt the backseat;

a lock mechanism that restrains the operation unit to disable the operation when the seat is arranged in a specific state relative to the vehicle; and a cable that is pulled when the seat is arranged in the specific state, wherein the operation unit can be displaced from an initial position to an operation position at a time of the operation, the lock mechanism includes a stopper that is linearly moved to be engaged with and released from the operation unit in the initial position, and the stopper is connected to the cable to be linearly moved from an ordinary unrestrained position at which the operation unit is unrestrained from the lock mechanism to enable the operation to a restrained position at which the operation unit is restrained by the lock mechanism to disable the operation.

2. The seat device according to claim 1, wherein the stopper is supported in a state where the stopper is linearly moved in front and back directions of the seat on a substantially horizontal plane.

3. The seat device according to claim 1, wherein the stopper is normally held at the unrestrained position by biasing means, and when the stopper is pulled by the cable, the stopper is linearly moved to the restrained position against a biasing force of the biasing means, and is held at the restrained position.

4. The seat device according to claim 1, wherein the operation unit includes an operation lever that is swingably supported between the initial position and the operation position at a front end side of an armrest in the seat, the operation lever is provided with an abutting portion that is engaged with and released from the stopper, the abutting portion being provided on an end side of the operation lever, and the cable penetrates through the abutting portion of the operation lever, and is directly connected to the stopper arranged ahead of the abutting portion.

5. The seat device according to claim 1, further comprising:

a rotation mechanism that rotates the seat about a rotation axis; and a sliding mechanism that causes the seat to advance and retract from a fixed side, together with the rotation mechanism, wherein by interlocking of the rotation mechanism and the sliding mechanism, the state of the seat can be converted into a long state where the backrest is substantially parallel to and along a vertical side wall of the vehicle, and a cross state where the backrest is separated from the vertical side wall in an orientation substantially orthogonal to the long state, and the seat is the long state when the seat is arranged in the specific state.

6. The seat device according to claim 5, further comprising:

a leg stand that is the fixed side of the seat;

a movable stand supported by the leg stand so as to be able to advance and retract via the sliding mechanism, the seat being rotatably supported by the movable stand via the rotation mechanism;

an engaging portion provided in the leg stand; and an engaged portion provided in the movable stand, the engaged portion being engaged with the engaging portion to be displaced when the seat is in the long state, wherein the engaged portion and the stopper are connected by the cable, and the cable is pulled based on displacement of the engaged portion.

* * * * *